(12) United States Patent
Hata et al.

(10) Patent No.: US 8,031,213 B2
(45) Date of Patent: Oct. 4, 2011

(54) DISPLAY CONTROL METHOD AND DEVICE THEREOF

(75) Inventors: Ryouta Hata, Fukuoka (JP); Jun Ikeda, Fukuoka (JP); Shuichi Ojima, Osaka (JP); Tsuyoshi Hirashima, Osaka (JP); Shinya Kiuchi, Osaka (JP)

(73) Assignee: Panasonic Corporation, Osaka (JP)

(*) Notice: Subject to any disclaimer, the term of this patent is extended or adjusted under 35 U.S.C. 154(b) by 804 days.

(21) Appl. No.: 11/993,358

(22) PCT Filed: Jun. 14, 2006

(86) PCT No.: PCT/JP2006/311958
§ 371 (c)(1),
(2), (4) Date: Dec. 20, 2007

(87) PCT Pub. No.: WO2007/000895
PCT Pub. Date: Jan. 4, 2007

(65) Prior Publication Data
US 2010/0097404 A1 Apr. 22, 2010

(30) Foreign Application Priority Data
Jun. 27, 2005 (JP) .................... 2005-185849

(51) Int. Cl.
*G09G 5/10* (2006.01)
(52) U.S. Cl. ...................... 345/690; 345/589
(58) Field of Classification Search ............ 345/12, 345/20, 63, 77, 89, 581–618, 690, 102, 104
See application file for complete search history.

(56) References Cited

FOREIGN PATENT DOCUMENTS

| JP | 8-201812 | 8/1996 |
|---|---|---|
| JP | 9-244548 | 9/1997 |
| JP | 11-65531 | 3/1999 |
| JP | 2000-148072 | 5/2000 |
| JP | 2000-315127 | 11/2000 |
| JP | 2002-229499 | 8/2002 |
| JP | 2003-195835 | 7/2003 |

OTHER PUBLICATIONS

International Search Report issued Sep. 19, 2006 in the International (PCT) Application No. PCT/JP2006/311958.

*Primary Examiner* — Kevin Nguyen
*Assistant Examiner* — Kenneth B Lee, Jr.
(74) *Attorney, Agent, or Firm* — Wenderoth, Lind & Ponack, L.L.P.

(57) ABSTRACT

There is provided a display control method capable of reducing unnecessary processing and unnecessary power consumption caused by is. The display control method uses an update judgment unit (33) for judging whether a display content has been updated, a characteristic amount extraction unit (36) for obtaining the characteristic amount of the display content, a control unit (20) for the characteristic amount extraction unit (36) to reference the obtained characteristic amount and decide a correction parameter, and a display content correction unit (35) for correcting the display content according to the correction parameter and outputting the corrected display content to a display device (40). When the update judgment unit (33) has judged that the display content is not updated, the control unit (20) cuts off power supply to the characteristic amount extraction unit (36).

7 Claims, 4 Drawing Sheets

Fig. 2(a)

| update speed | parameter for light source | correction parameter |
|---|---|---|
| 20 | 0.00 | 100.00 |
| 19 | 0.14 | 20.00 |
| 18 | 0.63 | 10.00 |
| 17 | 1.54 | 6.67 |
| 16 | 2.90 | 5.00 |
| 15 | 4.74 | 4.00 |
| 14 | 7.07 | 3.33 |
| 13 | 9.93 | 2.86 |
| 12 | 13.32 | 2.50 |
| 11 | 17.26 | 2.22 |
| 10 | 21.76 | 2.00 |
| 9 | 26.84 | 1.82 |
| 8 | 32.50 | 1.67 |
| 7 | 38.76 | 1.54 |
| 6 | 45.63 | 1.43 |
| 5 | 53.10 | 1.33 |
| 4 | 61.21 | 1.25 |
| 3 | 69.94 | 1.18 |
| 2 | 79.31 | 1.11 |
| 1 | 89.33 | 1.05 |
| 0 | 100.00 | 1.00 |

Fig. 2(b)

| maximum luminance | parameter for light source | correction parameter |
|---|---|---|
| 0 | 0.00 | 100.00 |
| 5 | 0.14 | 20.00 |
| 10 | 0.63 | 10.00 |
| 15 | 1.54 | 6.67 |
| 20 | 2.90 | 5.00 |
| 25 | 4.74 | 4.00 |
| 30 | 7.07 | 3.33 |
| 35 | 9.93 | 2.86 |
| 40 | 13.32 | 2.50 |
| 45 | 17.26 | 2.22 |
| 50 | 21.76 | 2.00 |
| 55 | 26.84 | 1.82 |
| 60 | 32.50 | 1.67 |
| 65 | 38.76 | 1.54 |
| 70 | 45.63 | 1.43 |
| 75 | 53.10 | 1.33 |
| 80 | 61.21 | 1.25 |
| 85 | 69.94 | 1.18 |
| 90 | 79.31 | 1.11 |
| 95 | 89.33 | 1.05 |
| 100 | 100.00 | 1.00 |

DISPLAY CONTROL METHOD AND DEVICE THEREOF

TECHNICAL FIELD

The present invention relates to a display control method and a device using the same.

To be more specific, the present invention relates to technology of dynamically controlling, in accordance with an inputted display content, luminance adjustment of a light source and correction of the display content correlating with each other, in a display device that the light source lightens light to a passive display device, which is represented by a liquid crystal panel, and that displays an image thereon.

BACKGROUND ART

Conventionally, in order to reduce power consumption of a light source and to prolong a life of the device, technology is known for controlling luminance-adjusting values of the light source and correction parameter of display content correlating with each other according to inputted display signals or values measured by a photo sensor, a temperature sensor, or the like, thereby realizing power saving, and a long life.

Document 1 (Published Japanese patent application no. H11-65531) can be cited as one of conventional documents relating to such art.

The invention recited in Document 1 relates to a control method for mainly handling moving pictures. No matter whether or not a display content is updated, always, the characteristic amount of the display content is extracted, and the correction parameter of the display content and the luminance-adjusting value of a light source are all the time renewed based on the extracted characteristic amount.

Especially, in a case where a still picture is displayed, the display content has not been changed for a number of frames. Even in such a case, characteristic amounts are extracted, the correction parameter of display contents and luminance-adjusting values of the light source are kept being renewed. Considerable electric power is consumed by such unnecessary processing.

Electronic devices mainly used for displaying still pictures, have often display resolution higher than that of electronic devices for mainly displaying moving pictures. Therefore, the higher display resolution the electronic devices have, the heavier the burden according to the above-mentioned unnecessary processing is.

Especially, in an electronic device for mainly displaying still pictures, for example an electronic book, a display content is kept not be updated, while a user thereof reads the display content of the displayed pages. Therefore, unnecessary processing regarding some hundreds or thousands of frames is carried out, and considerable electric power is wastefully consumed.

[Document 1] Published Japanese patent application no. H11-65531

DISCLOSURE OF INVENTION

Problem(s) to be Solved by Invention

In view of the above, an object of the present invention is to provide a display control method capable of reducing unnecessary processing and wasteful power consumption caused thereby, and arts related thereto.

Means for Solving Problem(s)

A first aspect of the present invention provides a display control method, comprising: correcting a display content in accordance with correction parameter; controlling a light source in accordance with parameter for the light source; and renewing, according to whether or not the display content is updated, the correction parameter and the parameter for the light source.

With this structure, by reducing unnecessary processing when the display content is not updated, wasteful power consumption caused thereby can be reduced. Therefore, power consumption is reducible all the more.

A second aspect of the present invention provides a display control method as defined in the first aspect of the present invention, wherein the display content is updated accompanying with a user's operation.

With this structure, accompanying with the user's operation, the parameter for the light source and the correction parameter of the display content can be renewed.

A third aspect of the present invention provides a display control method as defined in the first aspect of the present invention, wherein the display content is updated accompanying with information possessed by the display content and/or a comparison result regarding the display content.

With this structure, whether or not the display content is updated is automatically judged, accompanying with the judgment result, the parameter for the light source and the correction parameter of the display content can be renewed.

A fourth aspect of the present invention provides a display control method as defined in the first aspect of the present invention, further comprising: storing a characteristic amount of the display content for determining the correction parameter, wherein the correction parameter and the parameter for the light source is renewed according to the stored characteristic amount.

With this structure, when a pre-specified display content is displayed, referring to a characteristic amount already stored relating thereto, the pre-specified display content can be quickly displayed. In addition, if the characteristic amount of the displayed display content is once stored, it becomes unnecessary to extract the characteristic amount again, and power consumption thereby can be reduced.

A fifth aspect of the present invention provides a display control method as defined in the first aspect of the present invention, further comprising: obtaining updating speed of the display content, wherein the parameter for the light source is renewed in a manner such that the larger the obtained updating speed becomes, the less light intensity of the light source is.

With this structure, the larger the updating speed becomes, the more power consumption of the light source can be reduced. This arrangement, however, does not substantially spoil conspicuousness of the display content.

Effect of Invention

According to the display device of the present invention, when a display content is not updated, unnecessary processing is not performed. Thereby, power consumption thereof can be reduced.

BEST MODE FOR CARRYING OUT THE INVENTION

An embodiment of the present invention will now be discussed with reference to the drawings.

FIG. 1 is a block diagram illustrating a display control device and a display device according to the embodiment of the present invention.

As illustrated in FIG. 1, the display control device is provided with an input unit 10, a control unit 20, a storing unit 21, a semiconductor integrated circuit 30, and a power source-controlling unit 50.

The input unit 10 is composed of a remote controller, a key set, or a touch panel, and receives a user's instruction to output it to the control unit 20.

The control unit 20 is composed of a CPU, a ROM, or the like, and controls each element of FIG. 1.

The storing unit 21 is composed of storage media, such as a memory, a hard disk drive, or a DVD, or the like, and is accessed from the control unit 20. The storing unit 21 stores characteristic amounts extracted by a characteristic amount-extracting unit 36.

If the characteristic amount of the display content displayed before several pages, namely, in the past, has been stored by the storing unit 21, it becomes unnecessary to extract the characteristic amount of the same display content repeatedly, and the power consumption of the characteristic amount-extracting unit 36 can be reduced. The characteristic amount stored by the storing unit 21 can be arbitrarily defined as much as the capacity of the storing unit 21 allows.

It is preferable to extract a characteristic amount of the display content that will be displayed after several pages, namely, in the future, to store it to the storing unit 21, at any time (e.g. immediately after activation) before a user issues an instruction, when the user reads the display content and there is few processing to perform and a load is light.

The storing unit 21 stores a first table illustrated in FIG. 2(a), which stores each value of parameter for a light source and correction parameter utilizing updating speed as an index, and a second table illustrated in FIG. 2(b), which stores each value of parameter for the light source and correction parameter utilizing a characteristic amount (in this example, a value of maximum luminance) as an index. The first and second tables may be provided in the control unit 20.

Herein, the "updating speed" is the number of the frames displayed in a unit time. When the same frame continues being displayed, the value of updating speed is set to a value of "0." Like in cases of leafing through an electronic book, the value of updating speed becomes larger than a value of "0", when frames are updated sequentially.

In cases where pages are quickly turned over and updating speed becomes considerably large, it becomes difficult for user's eyes to follow the changing process. Utilizing this point, in this embodiment, the parameter for the light source and the light intensity is made smaller as updating speed becomes larger. Due to this, large power saving can be performed without affecting appearance seriously.

On the contrary, like in cases of the user continuing reading the same page, when the updating speed becomes smaller, the parameter for the light source and the light intensity is made larger than the cases where pages are quickly turned over. Due to this, a bright and readable display result can be attained.

The parameter for the light source and the correlation parameter (a coefficient to be multiplied with an image signal) have correlation relationship, each of which is almost in inverse proportion to the other.

In this embodiment, as illustrated in the second table of FIG. 2(b), the parameter for the light source is determined according to the value of maximum luminance. If the display device has a linear gradation characteristic, for example, when the value of maximum luminance is 80%, the parameter for the light source should be also 80%. In this example, however, the value is set to not 80% but 61.21%. Furthermore, according to the correlation relationship with the value of maximum luminance, the correction parameter is set to 1.25 (=100/80).

Needless to say, as long as the parameter can be determined without a hitch, independent tables, the same table, or other storage means may be used.

As illustrated in FIG. 1, the following elements are provided in the semiconductor integrated circuit 30. When a display content-transferring unit 31 inputs a transfer instruction from the control unit 20, the display content-transferring unit 31 outputs data of a corresponding display content to an update-judging unit 33 or a switch unit 34.

When the update judging unit 33 inputs the display content from the display content-transferring unit 31, the update judging unit 33 judges whether or not the display content is updated, and outputs a judgment result to the control unit 20.

As long as the update judging unit 33 can judge whether or not the inputted display content is updated, the update judging unit 33 may use an arbitrary method. For example, difference information between previous and following display contents used for scene-detecting methods, header and/or tag information attached with the display content, motion information used for compression methods, or, information obtained before this processing, may be used.

For example, the update judging unit 33 obtains at lease one of a total sum of absolute values of difference and a total sum of square errors, and compares the obtained at least one of the total sums with a predetermined threshold. The difference and the square errors relate to each value of corresponding pixels, which may be only specific pixels, of one comparison target and another comparison target. As a result of the comparison, when the total sum is less than the threshold, the update-judging unit 33 judges that the display content is "NOT UPDATED". On the contrary, when the total sum is greater than or equal to the threshold, it judges that the display content is "UPDATED".

The switch unit 34 is provided with a first switch S1 and a second switch S2, each of which operates independently. The first switch S1 is connected to a display content-correcting unit 35, and the second switch S2 is connected to a characteristic amount-extracting unit 36. The switch unit 34 makes the first switch S1 and the second switch S2 independently turn ON/OFF according to a notice of modification of display content inputted from the control unit 20.

Using a low pass filter or a histogram, the characteristic amount-extracting unit 36 extracts a value of maximum luminance of a display content in one frame as a characteristic amount, and outputs it to the control unit 20. Herein, the characteristic amount is not limited to the value of maximum luminance, and may be an arbitrary characteristic amount or an arbitrary combination of a plurality of arbitrary characteristic amounts, as long as the parameter for the light source and the correction parameter can be controlled correlating with each other.

When a characteristic amount (a value of maximum luminance) is inputted from the characteristic amount-extracting unit 36, the control unit 20, utilizing the second table illustrated in FIG. 2(b), determines parameter for the light source and correction parameter. Or, the control unit 20 measures updating speed based on the judgment result from the update judging unit 33, utilizes the first table illustrated in FIG. 2(a) based on the updating speed, and determines parameter for the light source and correction parameter.

When the correction parameter is inputted from the control unit 20, the display content-correcting unit 35 stores the correction parameter into an internal register thereof. Furthermore, when the first switch S1 is turned ON, the display content-correcting unit 35 multiplies a signal indicating the display content by the correction parameter, and outputs a result thereof to the display device 40 as a corrected display content.

The power source-controlling unit 50 inputs a power source-controlling instruction from the control unit 20, and changes, based on it, the power supply statuses to the semiconductor integrated circuit 30 itself, the display content-correcting unit 35, the characteristic amount-extracting unit 36, and a light source-controlling unit 43. Especially, when the update judging unit 33 outputs a judgment result indicating that the display content is not updated to the control unit 20, the control unit 20 cuts off power supply to the characteristic amount-extracting unit 36.

The content of FIG. 1 is a mere example, and can be changed into various forms. For example, the control unit 20 and the storing-unit 21 may be provided in a single semiconductor integrated circuit. Even if power supply to the characteristic amount-extracting unit 36 is not thoroughly cut off, changing the status thereof into a status where power consumption is lower than the ordinary power supply (e.g. a sleep mode), and/or turning a clock thereof off to reduce delay time to reboot, earn/earns certain power-saving effect. Therefore, the present invention also includes such cases.

As illustrated in FIG. 1, the display device 40 of this embodiment is a liquid crystal display, which represents a passive display device. That is, the display device 40 is provided with: a liquid crystal panel 41 operable to display an image according to the corrected display content; a light source 42 operable to lighten light that penetrates the liquid crystal panel 41; and the light source-controlling unit 43 operable to control light intensity of the light source 42 according to the parameter for the light source.

Although not shown in Figs., the display device 40 preferably possesses a frame memory for storing data of one frame. When the display content is not changed and the frame memory stores the corrected display content, the control unit 20 outputs a power source-controlling instruction to the power source-controlling unit 50 and can cut off power supply to the light source-controlling unit 43. The above is preferable because much more power-saving can be attained. However, the frame memory may be omitted.

Next, referring to FIG. 3, operation of the display control device of this embodiment will now be explained. First, at Step 1, the control unit 20 checks whether or not it is immediately after activation. If it is immediately after activation, at Step 21, the control unit 20 turns ON both the first and second switches S1 and S2 of the switch unit 34, and, at Step 22, outputs to the display content-transferring unit 31 a transfer instruction for transferring a display content of a head frame portion.

Thereby, the display content of the head frame portion is outputted to the display content-correcting unit 35 and the characteristic amount-extracting unit 36. The characteristic amount-extracting unit 36 extracts a characteristic amount of this display content, and outputs it to the control unit 20. At Step 23, the control unit 20, referring to the second table illustrated in FIG. 2(*b*), determines correction parameter and parameter for the light source, each of which is suitable for the inputted characteristic amount.

At Step 24, the control unit 20 checks whether or not the parameter is changed.

If the parameter is changed, at Step 25, the control unit 20 outputs each parameter to the display content-correcting unit 35 and the light source-controlling unit 43, respectively.

The display content-correcting unit 35 multiplies a signal indicating a display content by the inputted correction parameter, outputs the corrected display content to the liquid crystal panel 41, and the liquid crystal panel 41 displays an image according to the corrected display content. On the other hand, the light source-controlling unit 43 adjusts light intensity of the light source 42 according to the inputted parameter for the light source, and the light source 42 lightens light according to the parameter for the light source to the liquid crystal panel 41. The display of one frame is carried out by the above. Then, processing returns to Step 1.

If there is no change in the parameter, the control unit 20 returns processing to Step 1, without doing anything. As a result, the display device 40 maintains the last display status. In this case, the parameter is held with the present values. Alternatively, however, the parameter may be rewritten not to the present values but to predetermined initial values.

At Step 1, if it is not immediately after activation, the control unit 20 moves processing to Step 2. At Step 2, the control unit 20 checks whether or not the input unit 10 has inputted a user's instruction. If there is no input, the control unit 20 moves processing to Step 3, and checks whether or not this status has continued beyond in the predetermined period of time. If it has continued, the control unit 20 outputs to the power source-controlling unit 50 a power source-controlling instruction for cutting off power supply to the light source 42 and the semiconductor integrated circuit 30 itself. Due to this, large power-saving can be attained.

At Step 2, if there is an input of a user's instruction, the control unit 20 outputs to the power source-controlling unit 50 a power source-controlling instruction for performing power supply to the light source 42 and the semiconductor integrated circuit 30 itself, and, at Step 6, checks the content of the user's instruction.

When the content of the user's instruction indicates neither "UPDATE" (of the display content) nor "END", at Step 30, the control unit 20 carries out corresponding processing and returns processing to Step 2.

When the content of the user's instruction indicates "END", the control unit 20 outputs to the power source-controlling unit 50 a power source-controlling instruction for terminating all power supply, and then the processing ends. Afterward, the display control device and the display device wait for next activation.

When the content of the user's instruction indicates "UPDATE", at Step 7, the control unit 20 checks the number of page(s) to be updated. When the number of page(s) to be updated is two or more, at Step 8, it checks whether or not a corresponding characteristic amount has been stored by the storing unit 21. If it has not been stored, the control unit 20 advances processing to Step 16. Otherwise, the control unit 20 advances processing to Step 9.

If the corresponding characteristic amount has been stored, the characteristic amount-extracting unit 36 can omit to extract a characteristic amount, and a display content of the specified page can be quickly displayed.

At Step 9, the control unit 20 outputs a notice of modification of display content for turning ON the first switch S1 and turning OFF the second switch, and, at Step 10, outputs to the power source-controlling unit 50 a power source-controlling instruction for cutting off power supply to the characteristic amount-extracting unit 36. Thereby, the display content is not outputted to the characteristic amount-extracting unit 36, the characteristic amount-extracting unit 36 becomes in a halt status (that is, not consuming electric power), and power-saving can be attained. Then, the control unit 20 returns processing to Step 1.

At Step 7, when the updating number of pages is a value of "1", at Step 11, the control unit 20 compares updating speed with the predetermined threshold. When the updating speed is greater than or equal to the threshold, this case corresponds to, for example, a case where pages are quickly turned over. Then, the control unit 20 outputs a notice of modification of display content for turning ON the first switch and turning OFF the second switch S2, and, at Step 13, outputs to the power source-controlling unit 50 a power source-controlling instruction for cutting off power supply to the characteristic amount-extracting unit 36. Thereby, the display content is not outputted to the characteristic amount-extracting unit 36, the characteristic amount-extracting unit 36 becomes in a halt status (that is, not consuming electric power), and power-saving can be attained.

Herein, as this threshold of updating speed, it is preferable to set up updating speed (for example, a value of "10") at which a user can distinguish which the display content includes, characters or an image. Furthermore, at Step 11, in addition to the threshold of updating speed, a second threshold (e.g. a value of "20", that is, double of the above threshold) of updating speed at which the user cannot distinguish which the display content includes, characters or an image, may be set. In that case, it is preferable that the control unit 20 outputs to the light source-controlling unit 43 a light source-control instruction for making light intensity of the light source 42 zero when updating speed is greater than or equal to the second threshold.

At Step 14, the control unit 20 instructs to the display content-transferring unit 31 transmission of the display content.

On the other hand, at Step 15, utilizing the updating speed as an index, the control unit 20 determines correction parameter and parameter for the light source based on the first table illustrated in FIG. 2(*a*), and outputs them to the display content-correcting unit 35 and the light source-controlling unit 43, respectively.

As a result, the display content-correcting unit 35 multiplies a signal indicating the display content by the inputted correction parameter, the corrected display content is outputted to the liquid crystal panel 41, and the liquid crystal panel 41 displays an image according to the corrected display content. On the other hand, the light source-controlling unit 43 adjusts light intensity of the light source 42 according to the inputted parameter for the light source, and the light source 42 lightens light according to the parameter for the light source to the liquid crystal panel 41. Thereby, display when updating speed is large is carried out. Afterward, the control unit 20 moves processing to Step 24.

At Step 11, when updating speed is less than the threshold, at Step 16, the control unit 20 outputs to the display content-transferring unit 31 a transfer instruction, the display content-transferring unit 31 outputs the display content to the update-judging unit 33, and the update-judging unit 33 outputs a judgment result to the control unit 20.

When the judgment result indicates "UPDATED", the control unit 20 returns processing to Step 1. This is because extraction of a characteristic amount is needed.

When the judgment result indicates "NOT UPDATED", the extraction of a characteristic amount is not needed, at Step 18, therefore, the control unit 20 outputs a notice of modification of display content for turning ON the first switch S1 and turning OFF the second switch S2, and, at Step 19, outputs to the power source-controlling unit 50 a power source-controlling instruction for cutting off power supply to the characteristic amount-extracting unit 36. Thereby, the display content is not outputted to the characteristic amount-extracting unit 36, the characteristic amount-extracting unit 36 becomes in a halt status (that is, not consuming electric power), and power-saving can be attained.

At Step 20, the control unit 20 instructs to the display content-transferring unit 31 transmission of the display content. The display content-correcting unit 35 multiplies a signal indicating the display content by the present correction parameter, a corrected display content is outputted to the liquid crystal panel 41, and the liquid crystal panel 41 displays an image according to the corrected display content. On the other hand, the light source-controlling unit 43 adjusts light intensity of the light source 42 according to the present parameter for the light source, and the light source 42 lightens light according to the parameter for the light source to the liquid crystal panel 41. Thereby, display when the display content is updated, however, updating speed is small is carried out. Afterward, the control unit 20 moves processing to Step 1.

FIGS. 4 and 5 illustrate an electronic book device and a personal digital assistant, each of which implements the display control device regarding the present invention. In FIG. 4, user interfaces for jumping a display content every 10 pages are provided, like "+10 pages" and "−10 pages." And, user interfaces for jumping a display content for every page are provided, like "following page" and the "previous page."

Furthermore, a user interface for controlling to change a display content at a system side is provided, like "auto." The speed of an automatic skip can be increased by pushing the "+" button, or can be decreased by pushing the "−" button.

According to the present invention, it is apparent that any of user interfaces are available from the above explanation.

Of course, the above page numbers (e.g. a value of "10") are merely examples, and may be variously changed if needed.

As shown in FIG. 5, it is easily understood that the display control device according to the present invention is applicable to any kind, for example, a personal computer type, a personal digital assistant type, a cellular phone type, or the like, of mobile terminals.

INDUSTRIAL APPLICABILITY

The display device according to the present invention can be suitably used in a technical field of controlling display devices, for example, transmission type LCDs, or the like.

BRIEF DESCRIPTION OF DRAWINGS

FIG. 2(*a*) is an illustration of a first table according to the embodiment of the present invention, and FIG. 2(*b*) is an illustration of a second table according to the embodiment;

DESCRIPTION OF SYMBOLS

Figure 1:
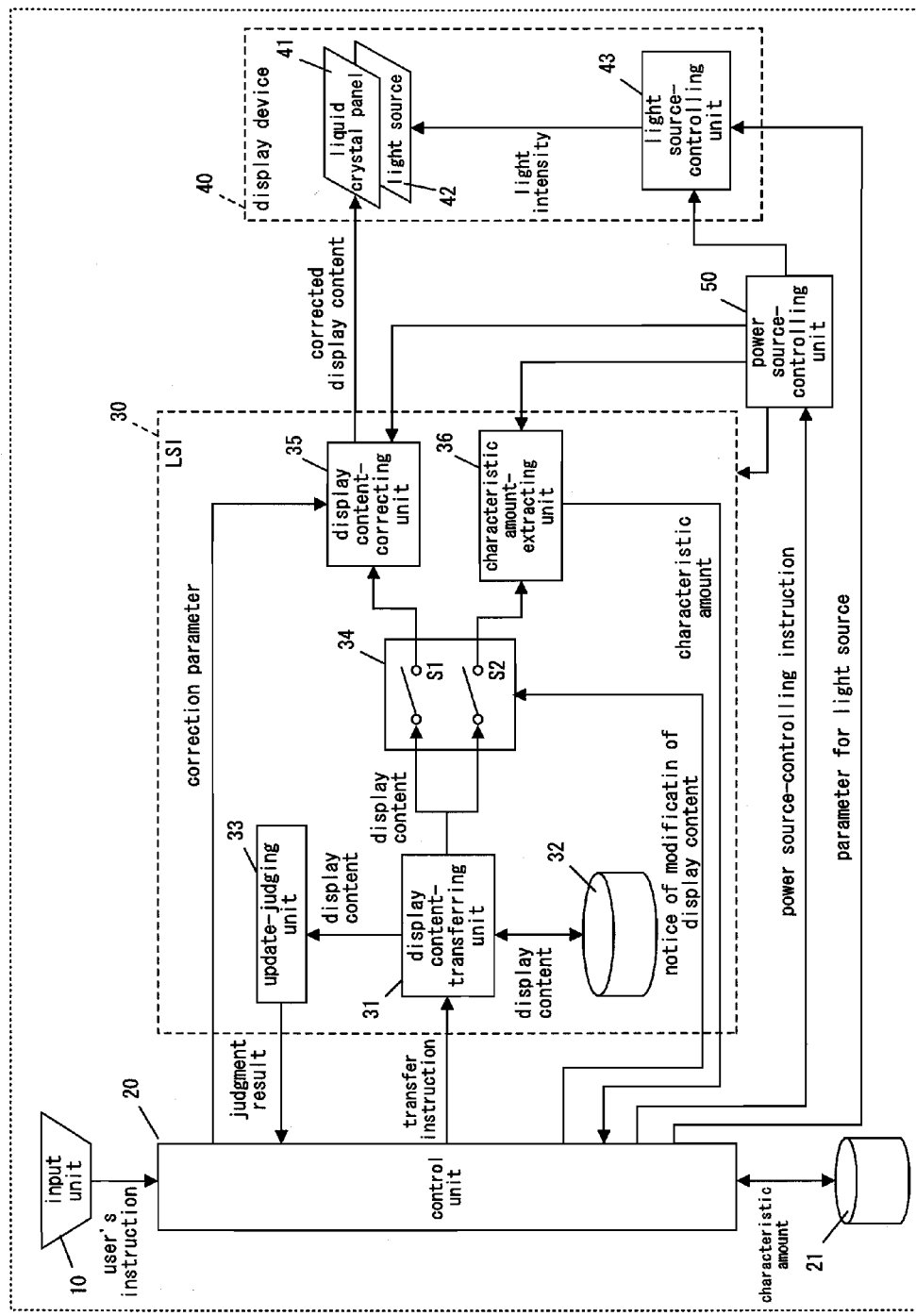
FIG. 1 is a block diagram of a display control device and a display device according to an embodiment of the present invention.
Figure 3:
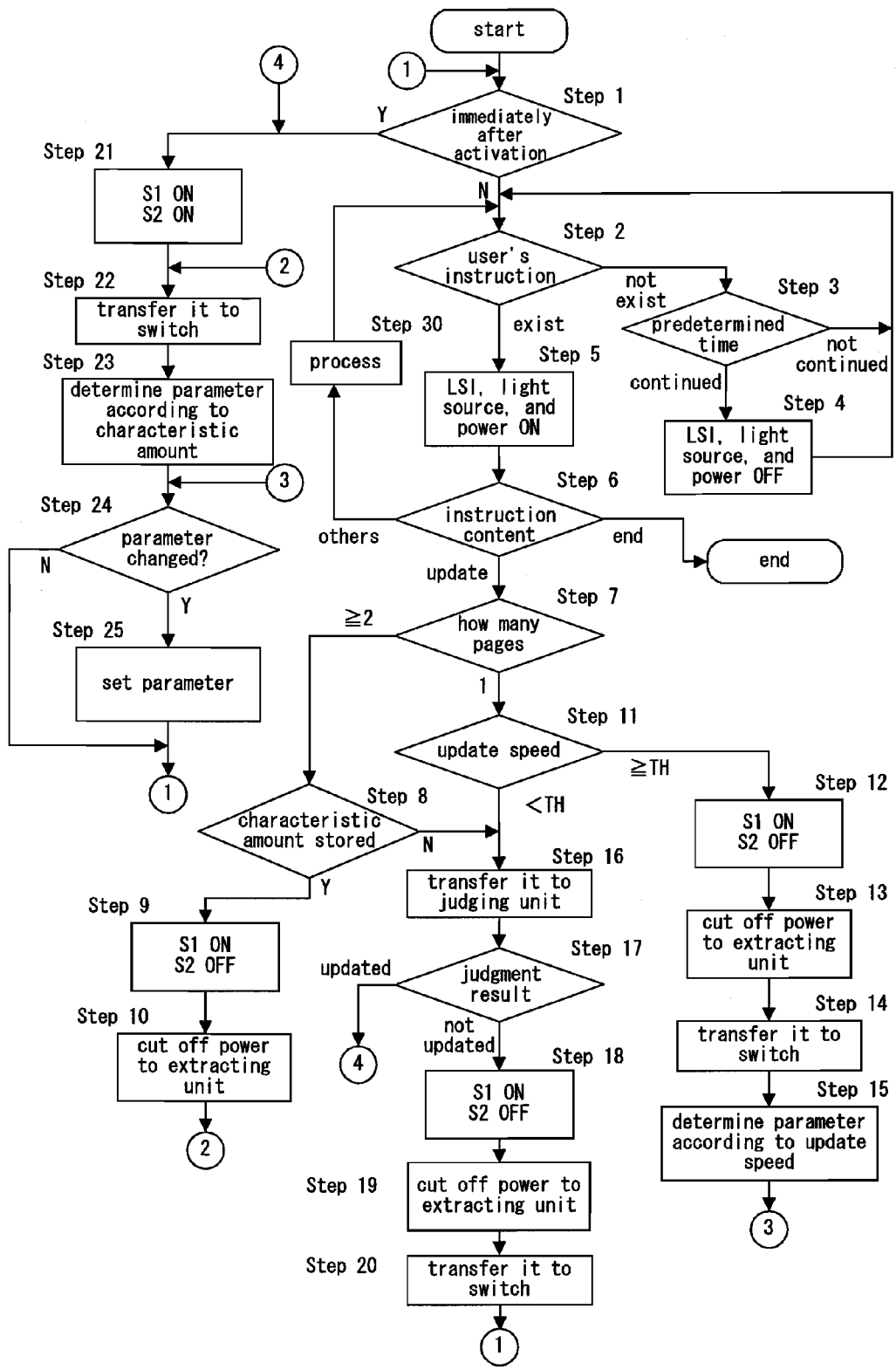
FIG. 3 is a flow chart of the display control device according to the embodiment of the present invention.
Figure 4:
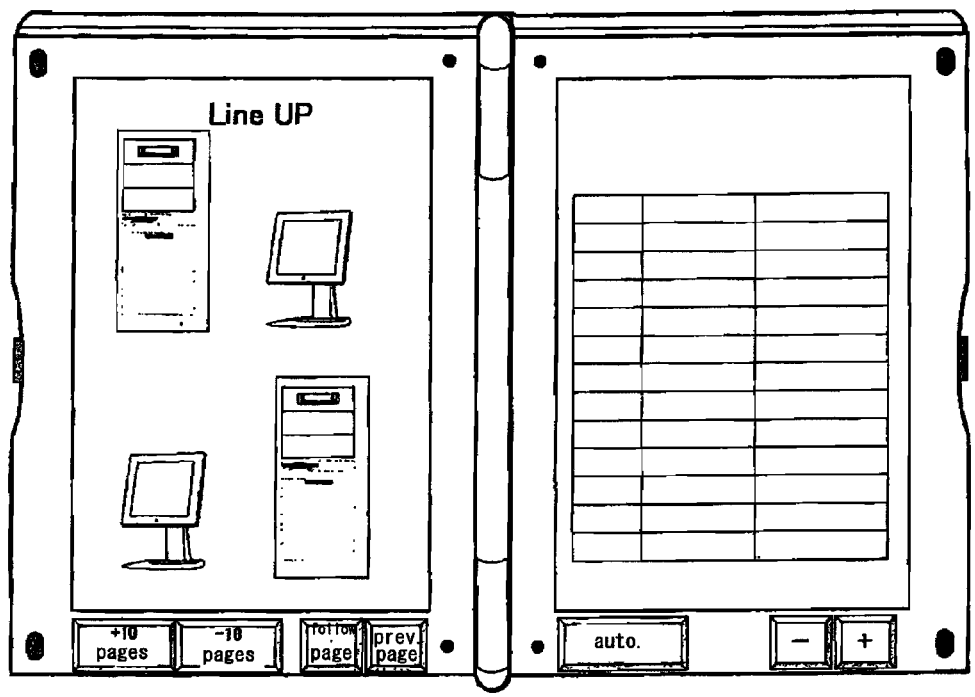
FIG. 4 is an outline view of an electronic book device implementing the display control device according to the embodiment of the present invention.
Figure 5:
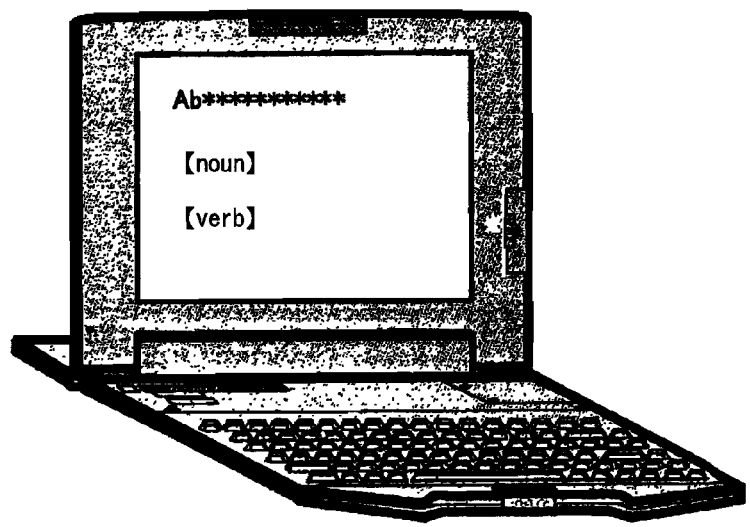
FIG. 5 is an outline view of a personal digital assistant implementing the display control device according to the embodiment of the present invention.

10 Input Unit
20 Control Unit
21 Storing Unit

30 Semiconductor Integrated Circuit
31 Display Content-transferring Unit
32 Display Content-Storing Unit
33 Update-judging Unit
34 Switch Unit
35 Display Content-correcting Unit
36 Characteristic Amount-extracting Unit
40 Display Device
41 Liquid Crystal Panel
42 Light Source
43 Light Source-controlling Unit
50 Power Source-controlling Unit

The invention claimed is:

1. A display control device, comprising:
an update-judging unit operable to judge whether or not a display content is updated;
a characteristic amount-extracting unit operable to extract a characteristic amount of the display content;
a control unit operable to refer to the characteristic amount extracted by said characteristic amount-extracting unit to determine correction parameter; and
a display content-correcting unit operable to correct, according to the correction parameter, the display content to output a corrected display content to a display device including: a light source; and a light source-controlling unit operable to control light intensity of the light source,
wherein said control unit changes statuses of power supply to said characteristic amount-extracting unit and said light source-controlling unit from ordinary statuses to statuses with less power consumption than the ordinary statuses when said update-judging unit judges that the display content is not updated.

2. A display control device as defined in claim 1, wherein said control unit refers to the characteristic amount extracted by said characteristic amount-extracting unit, said control unit determines the correction parameter to output the correction parameter to said display content-correcting unit, and said control unit determines parameter for said light source to output the parameter for said light source to said light source-controlling unit.

3. A display control device as defined in claim 2, wherein the statuses with less power consumption than the ordinary statuses are statuses of which power supply is cut off.

4. A semiconductor integrated circuit, comprising:
an update-judging unit operable to judge whether or not a display content is updated;
a characteristic amount-extracting unit operable to extract a characteristic amount of the display content;
a control unit operable to refer to the characteristic amount extracted by said characteristic amount-extracting unit to determine correction parameter; and
a display content-correcting unit operable to correct, according to the correction parameter, the display content to output a corrected display content to a display device including: a light source; and a light source-controlling unit operable to control light intensity of the light source,
wherein said control unit changes statuses of power supply to said characteristic amount-extracting unit and said light source-controlling unit from ordinary statuses to statuses with less power consumption than the ordinary statuses when said update-judging unit judges that the display content is not updated.

5. A display control method, comprising:
judging whether or not a display content is updated;
extracting a characteristic amount of the display content using a characteristic amount-extracting unit;
referring to the extracted characteristic amount to determine correction parameter; and
correcting, according to the correction parameter, the display content to output a corrected display content to a display device including: a light source; and a light source-controlling unit operable to control light intensity of the light source; and
changing statuses of power supply to said characteristic amount-extracting unit and said light source-controlling unit from ordinary statuses to statuses with less power consumption than the ordinary statuses when said judging judges that the display content is not updated.

6. A display control method as defined in claim 5, further comprising determining a parameter for the light source to output the determined parameter for the light source to the light source controlling unit.

7. A display control method as defined in claim 6, wherein the statuses with less power consumption than the ordinary statuses are statuses of which power supply is cut off.

* * * * *